United States Patent [19]
Jennings

[11] Patent Number: 4,738,092
[45] Date of Patent: Apr. 19, 1988

[54] WINDROW INVERTER AND SHIFTER

[75] Inventor: Richard E. Jennings, Manheim, Pa.

[73] Assignee: New Holland Inc., New Holland, Pa.

[21] Appl. No.: 99,976

[22] Filed: Sep. 23, 1987

[51] Int. Cl.[4] .......................................... A01D 78/00
[52] U.S. Cl. ...................................... 56/372; 56/370; 56/366; 56/376; 56/DIG. 21
[58] Field of Search .................... 56/14.8, 16.4, 182, 56/184, 185, 189, 190, 192, 228, 365, 378, 396, DIG. 21

[56] References Cited

U.S. PATENT DOCUMENTS

| | | | |
|---|---|---|---|
| 383,317 | 5/1888 | Owan | 56/189 |
| 2,390,375 | 12/1945 | Kucera | 56/370 |
| 2,609,651 | 9/1952 | Cymara | 56/370 |
| 2,629,223 | 2/1953 | Russell | 56/376 |
| 2,727,350 | 12/1955 | Kuhhman | 56/376 |
| 2,751,745 | 6/1956 | Magee | 56/372 |
| 2,761,270 | 9/1956 | Blaser et al. | 56/370 |
| 3,141,284 | 7/1964 | Reynolds | 56/192 |
| 3,496,713 | 2/1970 | Reinhardt et al. | 56/370 |
| 3,570,231 | 3/1971 | McCary et al. | 56/370 |
| 4,403,468 | 9/1983 | Yoder | 56/370 |
| 4,471,606 | 9/1984 | Ender | 56/372 |

FOREIGN PATENT DOCUMENTS

| | | | |
|---|---|---|---|
| 467818 | 2/1947 | Canada | 56/192 |
| 69059 | 9/1982 | European Pat. Off. | |
| 974388 | 2/1951 | France | 56/DIG. 21 |
| 1101716 | 10/1955 | France | 56/192 |

OTHER PUBLICATIONS

Pequea Machine Company Haymaker Model 466 Brochure.

Primary Examiner—John Weiss
Attorney, Agent, or Firm—Larry W. Miller; Frank A. Seemar; Darrell F. Marquette

[57] ABSTRACT

An apparatus selectively operable either to invert and laterally displace the windrow from its original position or merely to laterally displace the windrow without effecting an inversion thereof is disclosed wherein a first discharge chute can be utilized to effect an inversion of the windrow while a second discharge chute can be utilized for merely shifting the windrow without inversion. The discharge chute is positioned laterally of and adjacent the discharge end of a cross conveyor conveying an elevated windrow of crop material laterally of its original path of repose upon the ground. The first discharge chute redirects the flow of crop material forwardly and over a discharge edge whereupon the forward motion of the apparatus will effect an inversion of the windrow into a second path of repose laterally spaced from its original path. The second discharge chute redirects the flow of the windrow of crop material rearwardly from the cross conveyor and over a discharge edge for deposit upon the ground without effecting an inversion thereof. The discharge chutes can be operably mounted within a mounting sleeve carried by the frame of the apparatus while a second transport sleeve is provided to optionally carry the discharge chute not being placed into use.

3 Claims, 5 Drawing Sheets

WINDROW INVERTER AND SHIFTER

BACKGROUND OF THE INVENTION

The present invention relates generally to crop harvesting apparatus utilized for working windrows of crop material and, more particularly, to a machine operable to selectively invert or laterally shift a windrow of crop material without inversion to decrease the drying time thereof.

Various attempts to provide an apparatus to work a windrow of crop material, such as hay, have been provided in an attempt to decrease the time necessary to dry the crop material in the windrow so that further harvesting operations, such as baling, can be accomplished to remove the crop material from the field. Such prior art devices have attempted to invert the windrow of crop material so that the damp side thereof which was originally positioned adjacent the ground will be placed on top of the windrow to facilitate drying by the sun and air. Drying time can be further reduced by laterally displacing the windrow in addition to inverting it so that the dry side originally on top of the windrow is placed upon dry ground in a second path laterally displaced from the original path of the windrow.

In certain areas of the country, the drying action of the sun is so severe as to bleach the upper exposed portion of the windrow, even though the unexposed lower portion of the windrow adjacent the ground may still be damp. It is sufficient in such cases to shift the windrow over to fresh dry ground without inverting the windrow. Shifting will result in the sufficient drying of the lower damp portions of the windrow, yet will not expose this unbleached lower damp portion to the bleaching action of the sun. Excessive bleaching of the crop material in the windrow will lower the quality of the crop, resulting in lower prices therefor.

Accordingly, it would be desirable to provide a single machine for working windrows of crop material that could laterally shift the windrow while optionally permitting an inversion or non-inversion of the windrow at the desire of the operator.

SUMMARY OF THE INVENTION

It is an object of this invention to overcome the aforementioned disadvantages of the prior art by providing an apparatus operable to laterally shift a windrow of crop material onto dry ground and optionally invert or not invert the windrow.

It is another object of this invention to provide an apparatus that can be optionally used at the discretion of the operator to either invert the windrow to place a damp side thereof on top of the windrow for better drying capabilities or to merely shift the windrow in its same orientation onto dry ground.

It is an advantage of this invention that the windrow can be shifted onto dry ground without affecting an inversion thereof to minimize the bleaching of the crop material in the windrow by the sun.

It is another advantage of this invention that the operator of the apparatus can optionally effect an inversion of the windrow to place the damp side formally adjacent the ground on top of the windrow to decrease the drying time of the crop material.

It is a feature of this invention that the discharge chute is detachably mounted within a sleeve supported by the frame of the apparatus to position the discharge chute adjacent the discharge end of the cross conveyor.

It is another feature of this invention that a transport sleeve can be provided on the frame of the apparatus to carry the second discharge chute not being utilized during the operation of the windrow working apparatus.

It is still another feature of this invention to provide oppositely working discharge chutes that can be mounted on the apparatus within the same mounting sleeve.

It is still another object of this invention to provide an apparatus for selectively inverting or laterally shifting a windrow of crop material which is durable in construction, inexpensive of manufacture, carefree of maintenance, facile in assemblage, and simple and effective in use.

These and other objects, features and advantages are accomplished according to the instant invention by providing an apparatus selectively operable either to invert and laterally displace the windrow from its original position or merely to laterally displace the windrow without effecting an inversion thereof wherein a first discharge chute can be utilized to effect an inversion of the windrow while a second discharge chute can be utilized for merely shifting the windrow without inversion. The discharge chute is positioned laterally of and adjacent the discharge end of a cross conveyor conveying an elevated windrow of crop material laterally of its original path of repose upon the ground. The first discharge chute redirects the flow of crop material forwardly and over a discharge edge whereupon the forward motion of the apparatus will effect an inversion of the windrow into a second path of repose laterally spaced from its original path. The second discharge chute redirects the flow of the windrow of crop material rearwardly from the cross conveyor and over a discharge edge for deposit upon the ground without effecting an inversion thereof. The discharge chutes can be operably mounted within a mounting sleeve carried by the frame of the apparatus while a second transport sleeve is provided to optionally carry the discharge chute not being placed into use.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
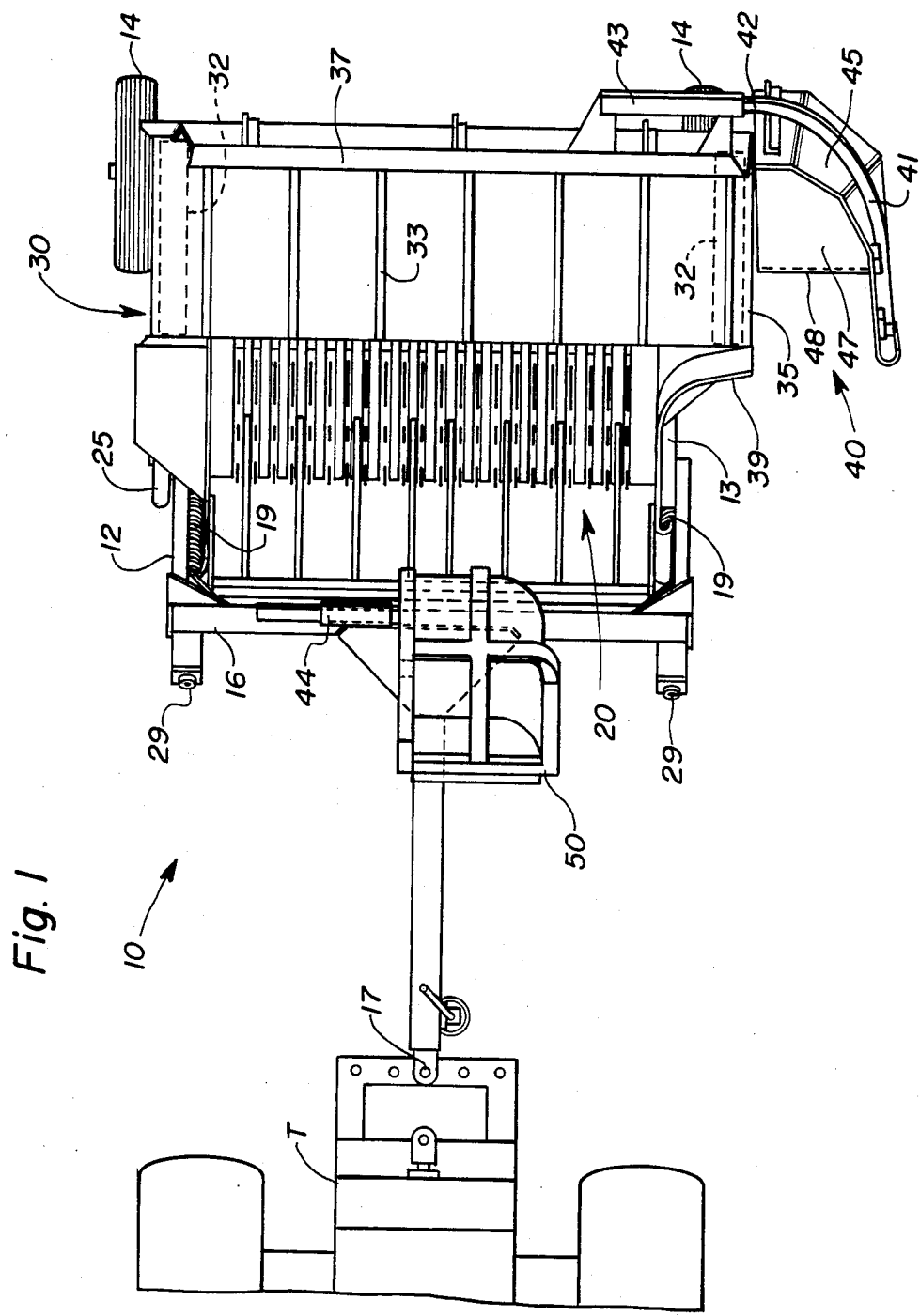
FIG. 1 is a top plan view of the windrow working apparatus having an inversion discharge chute mounted adjacent the cross conveyor, the shifter discharge chute being mounted in a transport position on a forward part of the frame.
Figure 3:
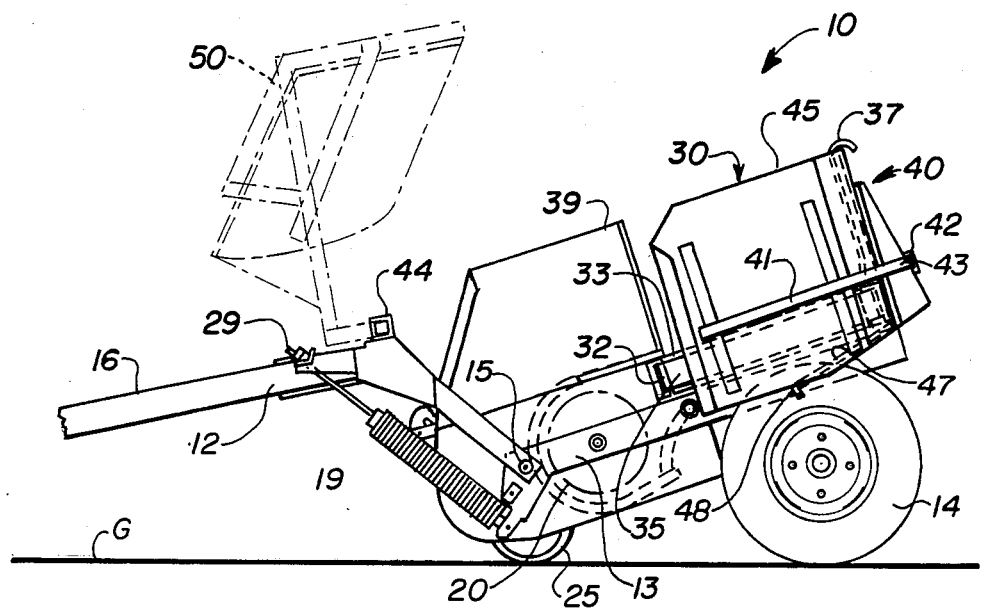
FIG. 3 is a left side elevational view of the apparatus for working a windrow corresponding to FIG. 1 with the inversion discharge chute being mounted in the operative position, the optional transport mounting of the shifter discharge chute being shown in phantom.

Referring now to the drawings and, particularly, to FIGS. 1 and 3, a top plan and left side elevational view of an apparatus for working a windrow of crop material, commonly referred to as a windrow turner, can be seen. Any left and right references are used as a matter of convenience and are determined by standing at the rear of the machine, facing the forward end, looking in the direction of travel.

The windrow turner 10 is provided with an articulated frame 12 including a support portion 13 supported above the ground by a pair of ground wheels 14 and a hitch portion 16 pivotally connected to the support portion 13 by a horizontally extending transverse pivot 15 and equipped at the forward end thereof with a hitch member 17 for connection of the windrow turner 10 to a prime mover, such as a tractor T. A pair of laterally spaced flotation springs 19 interconnect the support portion 13 and the hitch portion 16 of the frame 12 to urge the articulated frame 12 to pivot upwardly. As will be discussed in greater detail below, the biasing force exerted by the flotation springs 19 helps the windrow turner 10 to more easily follow the changing contours of the ground G.

A rotating tine pickup mechanism 20 is mounted on the support portion 13 of the frame 12 and is operable to engage a windrow of crop material lying on the ground G and elevate the windrow upon the windrow turner 10. The pickup mechanism 20 is provided with at least one adjustably mounted gauge wheel 25 which engages the ground G during operation of the windrow turner 10 and maintains a preselected height of the pickup mechanism 20 relative to the ground G. Because the flotation springs 19 control the weight of the machine 10 exerted upon the gauge wheel 25, the amount of weight being adjustable by means of a conventional adjustment bolt 29, the articulation between the support portion 13 and the hitch portion 16 of the frame 12 permits the pickup mechanism 20 to easily follow changing contours of the ground G.

Mounted on the support portion 13 of the frame 12 rearwardly of the pickup mechanism 20, the cross conveyor 30 is operable to receive the windrow of crop material elevated by the pickup mechanism 20 and convey it laterally upon the machine 10. The cross conveyor 30 includes a pair of laterally spaced rollers 32 about which a draper belt 33 is entrained. Both the pickup mechanism 20 and the cross conveyor 30 are driven by a ground drive mechanism (not shown) to convey the windrow of crop material toward the left discharge end 35 of the cross conveyor 30. An upright wall 37 is mounted on the support portion 13 of the frame 12 immediately rearwardly of the cross conveyor 30 to prevent the flow of the windrow rearwardly over the cross conveyor 30 and to help direct the windrow toward the discharge end 35 of the conveyor 30. A generally arcuate transition wall 39 extends from the left side of the pickup mechanism 20 to the forward side of the discharge end 35 of the crop conveyor 30 to facilitate the flow of the windrow of crop material from the pickup mechanism 20 to the discharge end 35 of the cross conveyor 30.

An inversion discharge chute 40 is positioned adjacent the discharge end 35 of the cross conveyor 30 to receive the windrow of crop material being conveyed thereby. The inversion discharge chute 40 includes a subframe 41 having a transversely extending mounting arm 42 telescopically received in a mounting sleeve 43 and held into place relative thereto by a connecting mechanism (not shown), such as a bolt. A transport sleeve 44 is mounted on a forward location of a hitch portion 16 of the frame 12 and can be utilized to carry a discharge chute for non-operative transport thereof, such as the shifter chute as described below. The inversion discharge chute 40 includes a generally upright diversion wall 45 generally arcuately extending from a transversely extending position adjacent the upright wall 37 to a longitudinal extending position substantially parallel to the discharge end 35 of the cross conveyor 30 but spaced laterally outboard thereof. The diversion chute 40 is also provided with a floor member 47 sloping downwardly and forwardly from the transverse portion of the diversion wall 45 and terminating in a discharge edge 48 over which the windrow will be discharged to the ground G.

Figure 2:
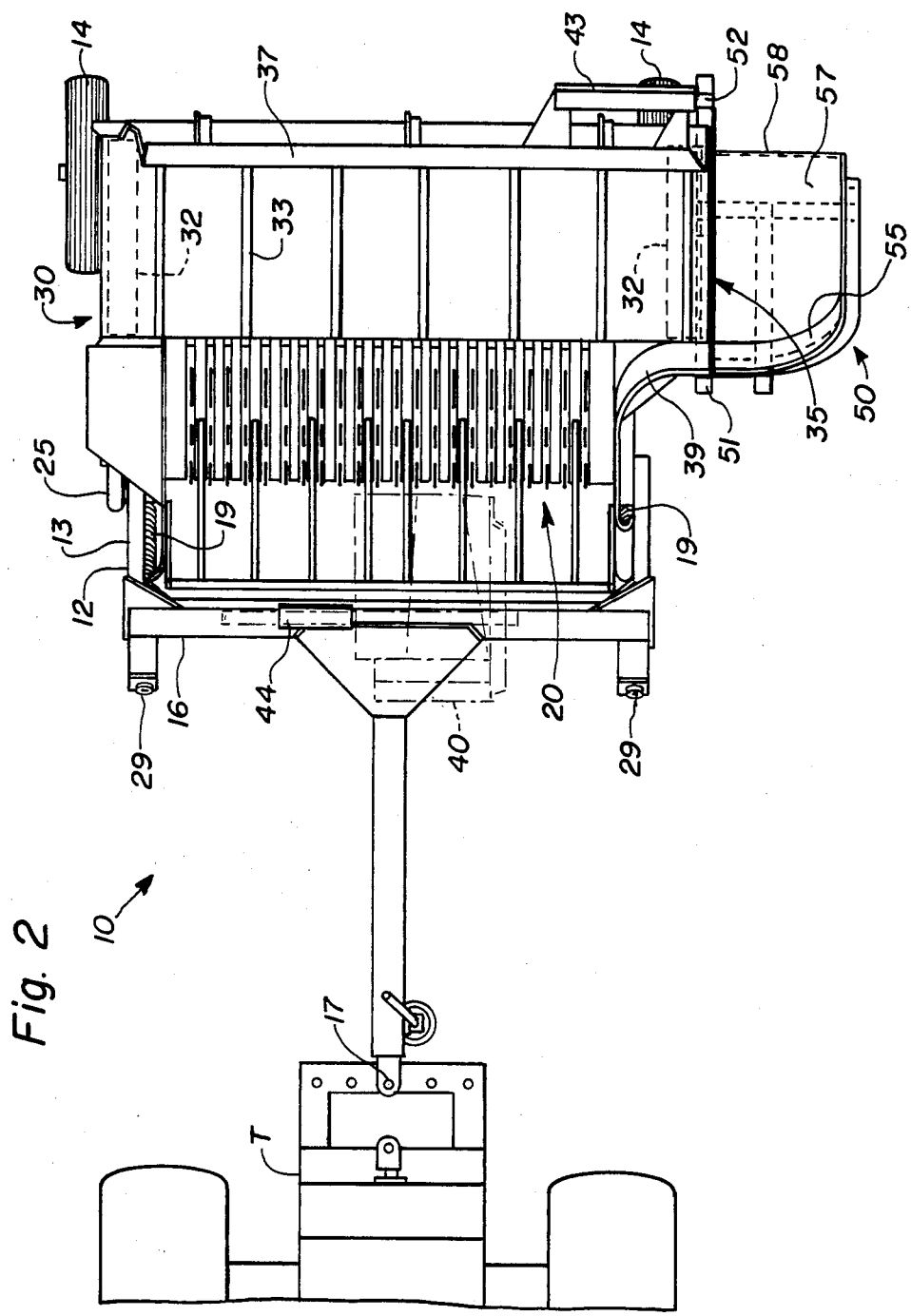
FIG. 2 is a top plan view of the apparatus for working a windrow with the shifter discharge chute being operably mounted adjacent the discharge end of the cross conveyor, the optional transport mounting of the inversion discharge chute being shown in phantom.
Figure 4:
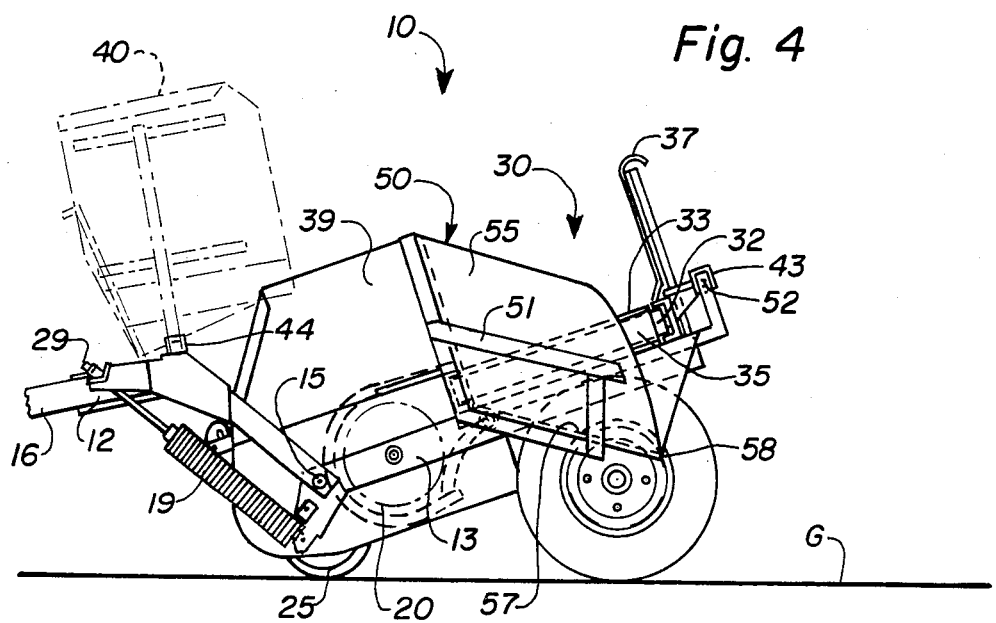
FIG. 4 is a left side elevational view of the apparatus for working a windrow corresponding to FIG. 2 with the shifter discharge chute being mounted in its operative position, the optional transport mounting of the inversion discharge chute being shown in phantom.

Referring now to FIGS. 2 and 4, the operation of the machine 10 for use as a windrow shifter can best be seen. The components of the machine 10 are identical to the description above relative to FIGS. 1 and 3, except for the inversion discharge chute 40. To permit the machine 10 to operate as a windrow shifter without inverting the windrow, a shifter discharge chute 50, having a subframe 51 including a mounting arm 52, is mounted on the mounting sleeve 43 instead of the inversion discharge chute 40. To prevent interference with the flow of the windrow from the cross conveyor 30 into the shifter discharge chute 50, the subframe 51 includes a portion thereof passing beneath said cross conveyor 30, permitting the mounting arm 52 to be supported in the mounting sleeve 43 with an unimpeded flow of the windrow rearwardly from the chute 50.

The shifter discharge chute 50 is also provided with a diversion wall 55 extending generally arcuately from a transversely extending position contiguous with the transition wall 39 to a longitudinally extending position rearwardly of the diversion wall 39, generally parallel to the discharge end 35 of the cross conveyor 30 and spaced outwardly from the discharge end 35. The shifter discharge chute 50 is also provided with a floor member 57 extending from the diversion wall 55 and terminating in a rearward discharge edge 58. The floor member 57 of the shifter discharge chute 50 is sloped downwardly and rearwardly from the transition wall 39. As noted above with respect to FIGS. 1 and 3, when one of the discharge chutes 50 is being utilized in the operative position, i.e., mounted in the mounting sleeve 43, the other discharge chute 40 may be inoperatively carried by the machine 10 by engagement thereof with the transport sleeve 44.

Figure 5:
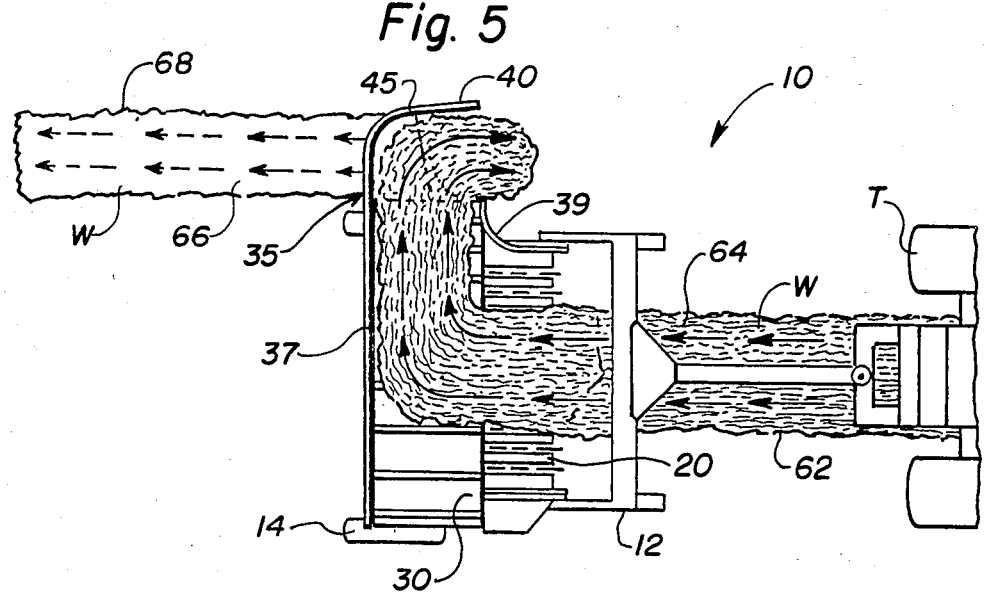
FIG. 5 is a schematic top plan view of the apparatus shown in FIGS. 1 and 3 depicting an inversion of the windrow upon discharge from the apparatus.
Figure 6:
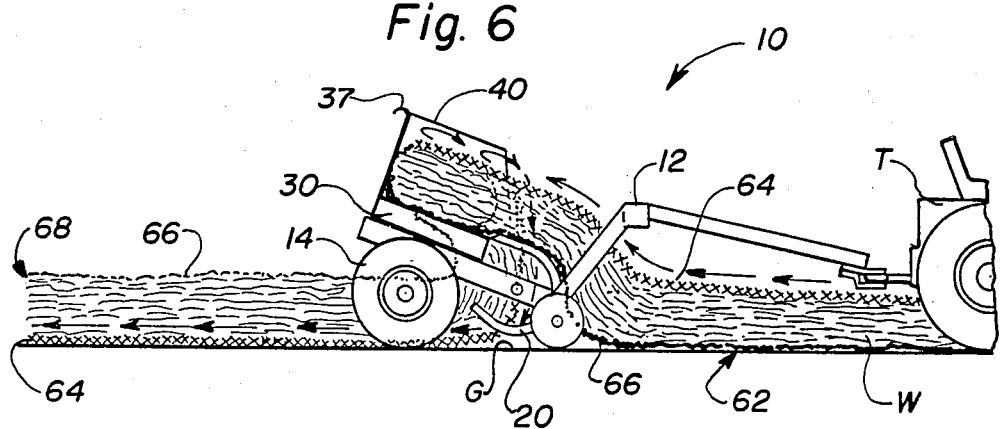
FIG. 6 is a schematic right side elevational view corresponding to FIG. 5, the dry side of the windrow being depicted by a series of X's.

Referring now to FIGS. 5 and 6, the operation of the machine 10 using the inversion discharge chute 40 to invert and laterally displace the windrow of crop material W can best be seen. The windrow turner 10 is hitched directly behind the tractor T so that a windrow W straddled by the tractor T can be engaged by the pickup mechanism 20. The windrow prior to being engaged by the pickup mechanism 20 is lying in a first path 62 in a first orientation in which the dry side of the windrow W, identified by the series of X's along the top of the windrow W, is positioned on the top side of the windrow W with a damp side 66 positioned adjacent the ground G. One skilled in the art will readily realize that the drying action of the sun and air is greater for the top of the windrow than the hidden bottom side adjacent the ground. Accordingly, the upper portions of the windrow will become dried and may become bleached while the lower side adjacent the ground will remain damp.

The windrow W is elevated by the pickup mechanism 20 unto the windrow turner 10 and immediately transferred rearwardly onto the cross conveyor 30. The windrow W is restrained by the upright wall 37 and the transition wall 39 while being conveyed laterally of the first path 62 on top of the cross conveyor 30 toward the discharge end 35. The windrow W is received by the inversion discharge chute 40 and redirected into a forward direction by the diversion wall 45. After passing over the discharge edge 48 of the floor member 47, the windrow W is discharged back to the ground G along a second path 68 laterally spaced from the first path 62. The forward motion of the windrow turner 10 rolls the windrow W over as it passes over the discharge edge 48.

As a result, the dry side 64 of the windrow W is positioned adjacent the ground G in the second path 68 while the damp side 66 is left on top of the windrow W to receive drying action from the sun and air. Furthermore, the ground G along the second path 68 will be substantially dry, as compared to the ground adjacent the damp side 66 of the windrow in the first path 62, further assisting in the drying of the crop material in the windrow W. The windrow W in the second path 68 is therefore in a second orientation with the damp side 66 being above the dry side 64. The windrow W is maintained in its first orientation until being discharged over the discharge edge 48 of the inversion discharge chute 40. This action helps maintain the integrity of the windrow W and minimizes damage to the crop material, e.g., leaf loss.

Figure 7:
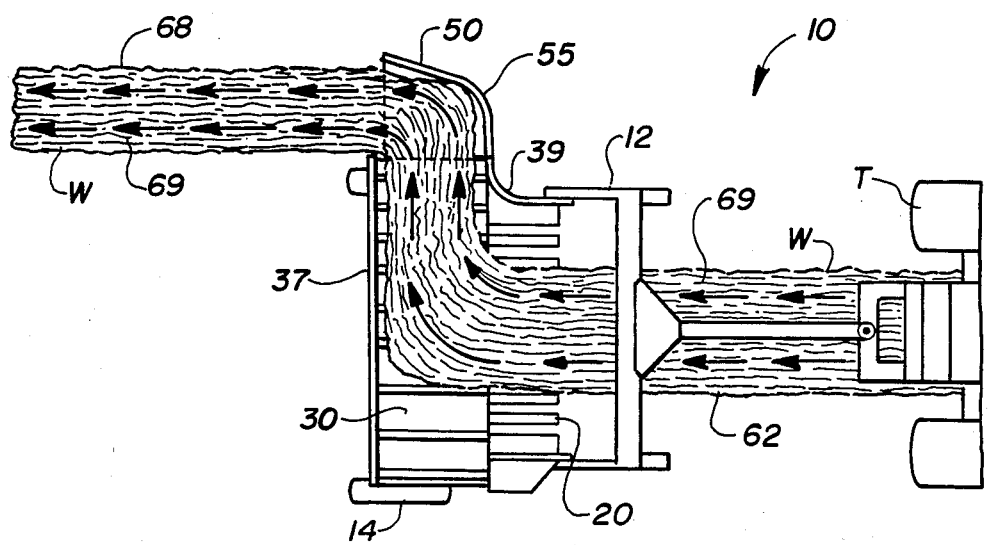
FIG. 7 is a schematic top plan view depicting the operation of the apparatus corresponding to FIGS. 2 and 4, effecting a mere lateral shifting of the windrow without inverting it upon discharge to the ground.
Figure 8:
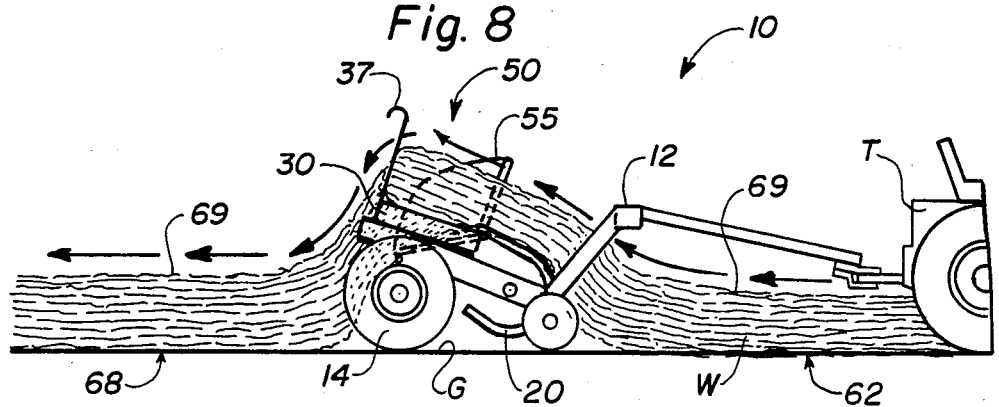
FIG. 8 is a schematic right side elevational view of the apparatus corresponding to FIG. 7.

Referring now to FIGS. 7 and 8, the operation of the machine 10 to perform as a windrow shifter can best be seen. As indicated above with respect to FIGS. 5 and 6, the windrow W lying in the first path 62 in a first orientation in which the bleached side is positioned on top of the windrow is straddled by the tractor T and engaged by the pickup mechanism 20. After being elevated by the pickup mechanism 20, the windrow W is conveyed laterally by the cross conveyor 30 while still in the first orientation and discharged over the discharge end 35 of the cross conveyor 30 into the shifter discharge chute 50. The diversion wall 55 of the shifter discharge chute 50 redirects the flow of the windrow W into a rearward direction to be passed over the discharge edge 58 and deposited on the ground G rearwardly of the machine 10 while still in its first orientation.

As a result, the bleached side of the windrow 69 remains on top of the windrow W while being shifted by the machine 10. This shifting action is generally utilized when it is desirable merely to shift the windrow W onto dry ground, where an inversion of the windrow will expose the unbleached lower side of the windrow to the bleaching action of the sun, resulting in a reduction of the quality of the crop material. The gentle handling of the windrow W by the pickup mechanism 20, cross conveyor 30 and shifter discharge chute 50 maintains the integrity of the windrow W and minimizes damage, such as leaf loss, to the crop material.

A more detailed description of the frame components can be found in co-pending patent application entitled "Frame for Windrow Inverter", filed concurrently herewith in the names of Philip J. Ehrhart and Bryant F. Webb. Furthermore, the inversion discharge chute 40 is also described in greater detail in co-pending patent application entitled "Inversion Chute for Windrow Turner", filed concurrently herewith in the names of Philip J. Ehrhart, Gilbert A. Cartee and Ernest A. Schoeneberger. To supplement the description given above, the descriptive portions of both of these co-pending applications identified above, insofar as they are not inconsistent herewith, are hereby incorporated herein by reference.

It will be understood that changes in the details, materials, steps and arrangements of parts which have been described and illustrated to explain the nature of the invention will occur to and may be made by those skilled in the art upon a reading of this disclosure within the principles of and scope of the invention. The foregoing description illustrates the preferred embodiment of the invention; however, concepts, as based upon the description, may be employed in other embodiments without departing from the scope of the invention. Accordingly, the following claims are intended to protect the invention broadly, as well as in the specific form shown.

Having thus described the invention, what is claimed is:

1. A machine for laterally displacing windrows of crop material lying on the ground in a first orientation with a dry side above a damp side positioned adjacent the ground, comprising:
   a frame adapted for movement over the ground in a forward direction of travel;
   a pick-up mechanism supported by said frame to engage and elevate said windrow from a first path on the ground;
   a cross conveyor supported by said frame rearwardly of said pick-up mechanism to receive said windrow from said pick-up mechanism and convey said windrow laterally of said direction of travel to a discharge end; and
   discharge means positioned adjacent said discharge end to receive said windrow from said cross conveyor, said discharge means being selectively positionable to redirect the movement of said windrow into a forward direction for discharge from said discharge means to effect an inversion of said windrow into a second orientation with said damp side being above said dry side when said machine is moving forwardly and to redirect the movement of said windrow into a rearward direction for discharge from said discharge means along a second path laterally spaced from said first path while maintaining said windrow in said first orientation.

2. The machine of claim 1 wherein said discharge means includes a first detachable discharge chute used to redirect the movement of said windrow into a forward direction and mounting means for detachably supporting said first discharge chute on said frame, said discharge means further including a second detachable discharge chute selectively engageable with said mounting means in lieu of said first discharge chute to redirect the movement of said windrow into a rearward direction.

3. The machine of claim 2 wherein said mounting means is positioned rearwardly of said cross conveyor, said second discharge chute having a subframe positioned at least partially beneath said cross conveyor to support said second discharge chute adjacent said discharge end.

* * * * *